Feb. 17, 1959

H. E. JACKSON 2,874,238

VARIABLE TIME SWITCHES

Filed Aug. 7, 1957

INVENTOR
Harold Ernest Jackson
BY
ATTORNEY

United States Patent Office 2,874,238
Patented Feb. 17, 1959

2,874,238

VARIABLE TIME SWITCHES

Harold Ernest Jackson, Wain Park, Plympton St. Maurice, England, assignor to Tecalemit Limited, Brentford, England Application August 7, 1957, Serial No. 676,739

Claims priority, application Great Britain September 14, 1956

7 Claims. (Cl. 200—38)

The present invention is concerned with a variable time switch.

Known variable time switches do not provide for the continuous action of mechanisms which they control. One object of this invention, therefore, is to provide a variable time switch which provides such continuous action.

While the invention is adapted to be used for many purposes, the invention will be more particularly described hereinafter with reference to its application to the invention described in the specification filed with our co-pending application Serial No. 644,514, that is to say, to a double-acting injector device which acts to force liquid or oil (hereinafter called "oil") to a place of use of the oil and which comprises a delivery or metering cylinder, a delivery or metering piston which is reciprocably arranged in the cylinder and which on each of its strokes acts to force oil from the cylinder space on one side of the piston through an outlet to a place of use of the oil and simultaneously allows oil to enter the cylinder space on the opposite side of the piston, and valve means which controls the flow of oil into the delivery or metering cylinder alternately first to the cylinder space on one side of the piston and then to the cylinder space on the opposite side of the piston and the flow of oil out of the cylinder alternately first from the cylinder space on one side of the piston and then from the cylinder space on the opposite side of the piston, the said valve means also acting to connect the cylinder spaces on opposite sides of the piston alternately to the said outlet.

The valve means consists of a fluid-actuated slide valve which is reciprocable in a cylinder connected by passages to the oil inlet to the delivery or metering cylinder on opposite sides of the piston therein and to the said oil outlet. The passage, connected to the oil outlet, is in constant communication with the valve cylinder, the arrangement being such that no matter on which stroke the delivery or metering piston is moving the cylinder space on one side of the piston is always connected to the outlet. The opening and closing of the passages connecting the valve cylinder to the delivery or metering cylinder are controlled by the movements of the valve. In one construction, the slide valve is moved in one direction by a compressed air-operated piston and in the other direction by the pressure of the oil which is fed into the delivery or metering cylinder, time-controlled means being provided whereby the air is fed into the cylinder in which the piston is slidable to cause the piston to carry out a stroke in one direction and then exhausted from the cylinder so that the piston may carry out its return stroke under the action of the oil upon the slide valve.

In the same construction, the slide valve is formed with three spaced valve parts connected by reduced parts or throats, so that two separated annular spaces are formed in the valve cylinder. Thus, when the slide valve has moved into one operative position the cylinder space on one side of the delivery or metering piston communicates with one of the said annular spaces and with the oil outlet, while when the valve has moved into its other operative position the cylinder space on the opposite side of the piston communicates with the other annular space.

A conduit for supplying compressed air to the air cylinder is connected to the air inlet to that cylinder and it leads through a distributor valve which acts to provide an alternating air supply to the cylinder. The distributor valve is associated with an electrically or mechanically-operated timing device, for example, an electrical make and break mechanism or a clock-work mechanism, and the timing device may be of known construction.

According to the present invention the variable time switch comprises a switch, a driving means, a ratchet mechanism or one-way clutch mechanism forming an operative connection between a continuously-rotating spindle driven by the driving means and a member which is adapted to operate the switch, and means which forms an operative connection between the said spindle and the clutch mechanism and causes the latter to operate intermittently and thus to cause the said member which operates the switch to rotate intermittently and unidirectionally to cause the switch to carry out its make and break movements at predetermined time intervals.

The said driving means may either consist of an electric motor or alternatively of a clockwork mechanism.

The said member which operates the switch may consist of a cam member associated with the switch and intermittently rotated in the same direction through the clutch mechanism by means of a spring-urged oscillating lever member which is operatively associated with the clutch mechanism. The lever member may be oscillated in one direction by means of a cam member which is rotated continuously and in the same direction by means of the said continuously-rotating spindle.

Means may also be provided for varying the angle of oscillation of the said lever member, so as to vary the number of turns of the said cam member which is associated with the switch and thus the number of operations of the switch within a given period.

Further constructional features of the invention will be described hereinafter.

One constructional form of the invention, which is particularly applicable to the double-acting fluid injector described in our said application Serial No. 644,514 will now be described, by way of example, with reference to the accompanying drawings, wherein.

Figure 1:
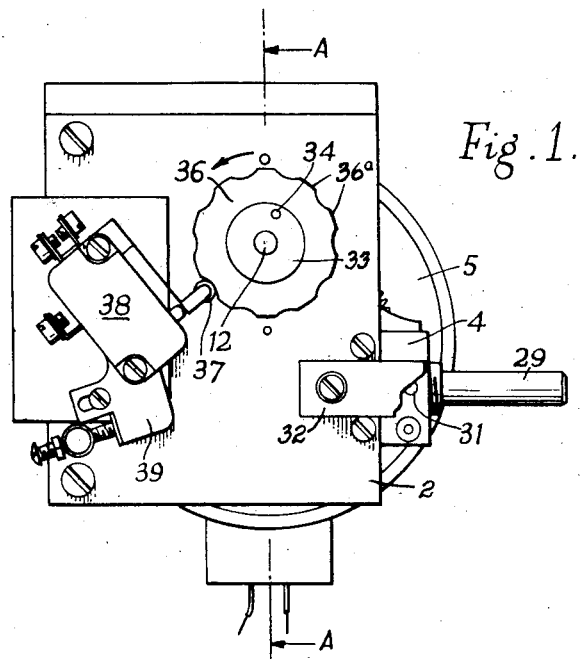
Fig. 1 is an end view of the variable time switch.

Referring to the drawings:

This variable time switch comprises two parallel rectangular rear and front frame plates 1 and 2 which are spaced apart by means of spacing members 3 and a block 4, the purpose of which latter will be referred to hereinafter.

A prime-mover in the form of an electric motor 5, is mounted on, and at the rear of, the rear frame plate 1 by means of spacing members 6 and 6a. A driving spindle 7, which is driven through reduction gearing 8 from the spindle of the electric motor 5, projects forwards and is guided in an opening in the lower part of the rear frame plate 1 and on it is fixed a sleeve 9 on to which there is press-fitted a 6-lobe cam 10 which is disposed on the sleeve between the two frame plates.

A bush 11 is press-fitted into an opening in the upper part of the rear frame plate 1 above the driving spindle 7 and it serves to support the rear end of a clutch spindle or shaft 12. The clutch shaft extends forwardly across the two frame plates and near to its front end the shaft 12 is supported in a second bush 13 which is arranged in an outwardly-projecting boss 14 of a cup-like fixed housing 15 which is attached to the front frame plate 1 and which partly encloses a driven clutch part or wheel 16 mounted on the clutch shaft. The width of the clutch housing 15 is such that it encloses circumferentially one half of the width of the driven clutch part.

Figure 3:
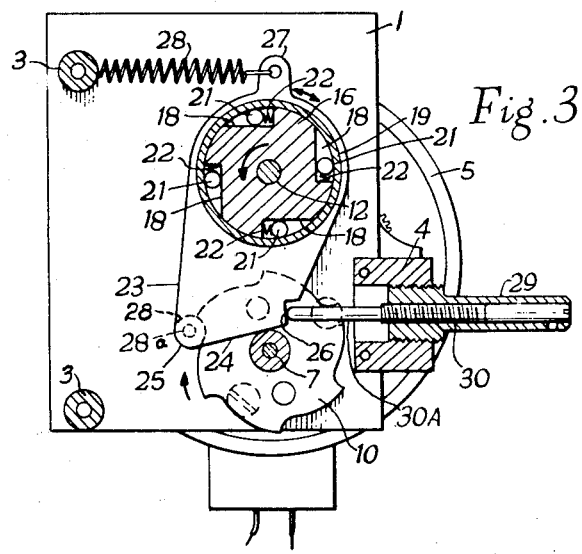
Fig. 3 is a section on the line B—B in Fig. 2.

The driven clutch part 16 is formed with a rearwardly extending boss 17 which is secured to the clutch shaft 12 by means of a pin 12a. The clutch part or wheel 16 is provided peripherally with four angled cut-out parts or notched recesses which form lands or platforms 18, Fig. 3 the planes of the longer side of the platforms substantially forming a square. The boss 19A of a cup-shaped clutch housing 19 is partially turnable about the boss 17 of the clutch wheel 16 and the width of this movable clutch housing is such that it surrounds circumferentially one half of the width of the clutch wheel which is nearest to the rear frame plate 1. Thus, the clutch wheel is entirely surrounded by the cup parts of the fixed housing 15 and the movable housing 19.

Two coaxial rollers 20 and 21 are arranged within each of the recesses formed by the lands 18 in the clutch wheel 16, the rollers 20 being within the ratchet housing 15 and the rollers 21 being within the ratchet housing 19 so that, by means of springs 22 acting on the rollers, four of the rollers 20 are in permanent contact with the fixed housing 15 while the other four rollers 21 are kept in permanent contact with the movable housing 19. A plate-shaped lever or arm 23 is mounted on and affixed to the rear face of the movable clutch housing 19, as at 23a (Fig. 2), and its lower edge 24 (Fig. 3), which is arranged at an upward angle to the horizontal, is formed at one end with a beak 25 and its opposite end with an angled recess 26. At its upper end the lever member is formed with an upstanding lug 27 to which one end loop of a coil spring 28 is anchored, the other end loop of the spring being anchored to one of the spacing members 3 between the two frame plates. The beak 25 carries a rearwardly-projecting pin 28a serving to carry a rolller 28 (Fig. 3), which is in interrupted contact with the periphery of the 6-lobe cam 10.

The above mentioned block 4 (Fig. 3) between the two frame plates is threaded internally to receive an externally-threaded hollow pointer spindle 29 which is internally threaded at 30 to receive a screw 30A intended, by cooperation with the angled recess 26 in the lower end of the lever member 23, to provide a micro-adjustable stop or abutment for the lever member. The block 4 is formed with a further hole drilled at right angles to the axis of the threaded hole and in which is inserted a short rod rod 31 (Fig. 1), which may be of plastic material, one end of which bears against the threaded part of the spindle 29, and is retained in position by a spring steel plate 32 which in turn is held by screws on the frame plate 2. The function of the rod 31 is to prevent movement of the pointer spindle 29 under vibration. At its outer end, the pointer spindle carries a pointer (not shown) which is intended for use in conjunction with a calibrated dial which may indicate the frequency for which the time switch is set or which may be otherwise calibrated so as to show other various functions of the time cycle.

Figure 2:
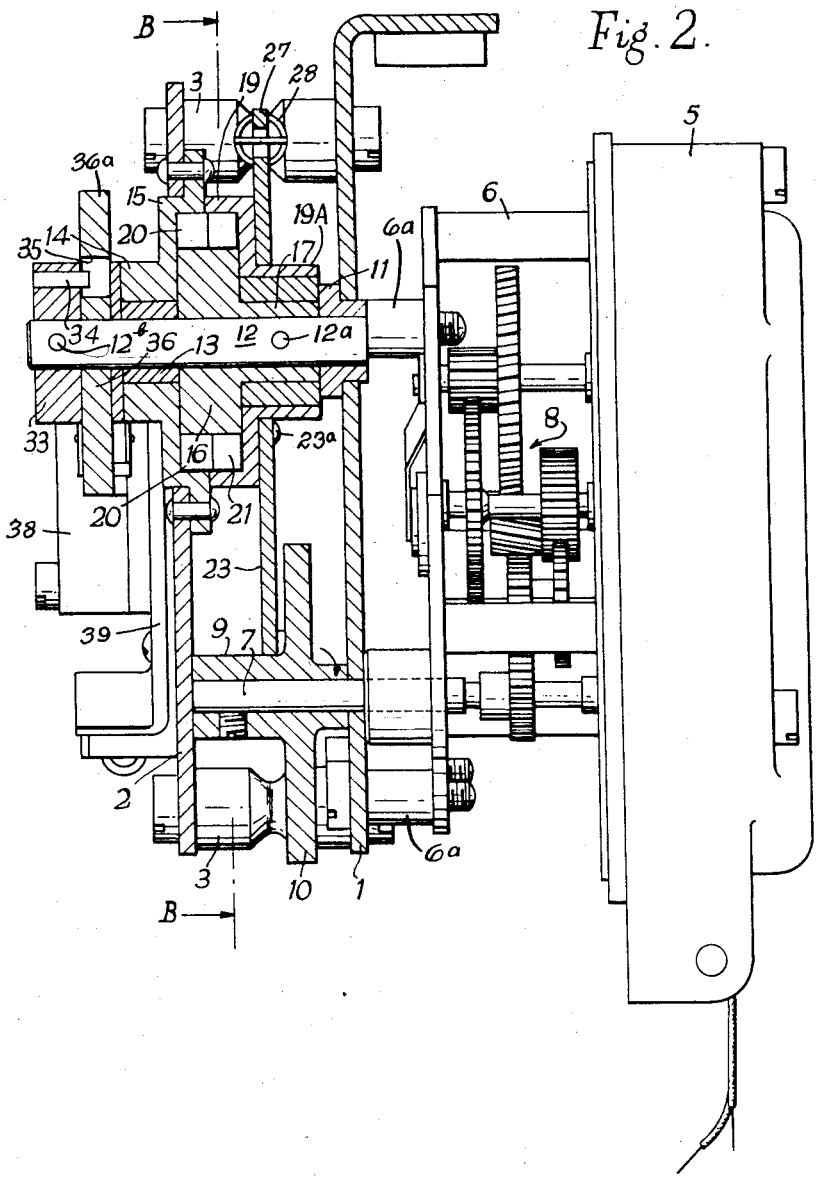
Fig. 2 is a section on the line A—A in Fig. 1.

The front end of the clutch spindle 12 which projects through the front frame plate 2 carries a collar 33 attached to the spindle by a pin 12b (Fig. 2). A pin 34 is arranged in and near to the periphery of the collar 33 and parallel to the axis of the clutch spindle 12, the pin projecting rearwards from the collar and being arranged to engage with a clearance fit in a hole 35 formed in the periphery of a ten-lobe cam 36 which is also arranged on the spindle 12 between the collar 33 and the fixed clutch housing 15. The lobes 36a of the cam 36 engage with the roller 37 of a known snap action electrical time switch 38 which is mounted on an adjustable mounting plate 39 secured to the front frame plate 2 (Fig. 1).

The operation of the variable time switch is as follows:
The driving spindle 7, which is driven by the electric motor 5, rotates the six-lobe cam 10 and, in so doing, causes the plate shaped lever member 23 to oscillate about the axis of the clutch shaft or spindle 12, the lever member 23 being returned to its original position under the action of the coil spring 28 acting upon the lever member. This to-and-fro movement or oscillation of the lever member 23 causes the clutch spindle 12 to rotate intermittently and, hence, the switch actuating lobe cam 36. However, when the plate shaped lever 23 is moved in a clockwise direction about the spindle 12 by the action of the cam 10, the four rollers 21, in engagement with the movable clutch housing 19, are urged against their springs 22 into the wider portion of their respective retaining recesses 18, so that they are free to rotate in their respective recesses without imparting any movement to the driven clutch part or wheel 16; and, at the same time, any tendency of the wheel 16 to move in a clockwise direction causes the other set of four rollers 20 to move towards the narrower part of their respective retaining slots thus jamming the four rollers 20 between the wheel 16 and the fixed clutch housing 15 and preventing any clockwise movement of the wheel 16.

On the other hand, when the plate shaped lever member 23 is returned in its oscillatory movement in a counter-clockwise direction by the biasing action of the spring 28, then the four rollers 21, which are in contact with the movable clutch housing 19, are urged towards the narrower parts of their respective retaining recesses 18 causing the rollers to become wedged between the movable clutch housing 19 and the ratchet wheel 16 and, thus, causing the latter to be moved counter-clockwise. At the same time, the four rollers 20 which are in contact with the fixed housing 15, are urged towards the wider parts of their respective recesses 18 so that they do not cause any wedging action between the wheel 16 and the fixed housing 15. The action of the roller clutch mechanism, therefore, causes the clutch shaft or spindle 12, and, consequently, the ten-lobe cam 36 on the spindle to rotate in a counter-clockwise direction and the rotation of the ten-lobe cam 36 also causes repeated make-and-break operation of the time switch 38. It will be appreciated that any variation in the angle of oscillation of the lever member 23 will produce the same variation in the angle of rotation of the clutch shaft 12. If the above mentioned pointer attached to the pointer (not shown) spindle 29 is moved by hand in a clockwise direction, the angle of oscillation of the plate shaped lever 23 and the number of turns of the ten-lobe cam 36 on the shaft 12 will be reduced, so that a reduction will thus be made in the number of operations of the time switch within a given period.

Although an electric motor is used as the prime-mover 5 in the constructional form of the invention which has been described above by way of an example of how the invention may be carried into effect, it will be readily appreciated that instead of using an electric motor to drive the variable time switch, the latter could be driven mechanically, such as by clockwork mechanism which would act to drive the driving spindle 7. Such a modified method of driving the spindle 7 will be quite clear to one skilled in the art.

As mentioned above, the variable time switch may be used for many purposes and its use in connection with the double-acting fluid injector forming the subject of our said co-pending application Ser. No. 644,514 has been referred to. The time switch may also be used in control mechanism employed in that constructional form of the liquid fuel burning heating system described in the specification filed with our co-pending application Ser. No. 641,598 in which the control valve with a frequency control is constructed as a solenoid-operated valve. In this case, the variable time switch would act to control the valve to allow adjustment of the cycle time of the valve.

I claim:

1. A variable time control mechanism for intermittently operating a switch, said mechanism comprising, a switch, a prime-mover, a spindle continuously rotated by said prime-mover in one direction, a member mounted and positioned to actuate said switch, an oscillatory to-and-fro movable element mounted and positioned between said member and said spindle, a lobe cam on said spindle for moving said element intermittently in one direction, said element being biased to return to its initial position after each intermittent operation by said spindle, a one-way clutch means connected and arranged between said to-and-fro element and said switch actuating member for operating said member unidirectionally at timed intervals, and a threaded abutment positioned to be contacted by said to-and-fro element for varying the degree of contact between said element and said lobe cam and, hence, the degree of movement imparted to said to-and-fro element by said continuously rotating spindle and while said mechanism is operating, whereby the number of operations of said switch may be varied within a given period of time.

2. In a mechanism of the character described, a supporting frame, a continuously rotatable spindle, a biased element supported by said frame and mounted for oscillatory movement; a cam on said spindle for moving said element periodically in one direction against its bias, a shaft journalled in said frame, a device positioned to be actuated from said shaft at predetermined intervals of time, a roller clutch means connected between said shaft and said oscillatory element for rotating said shaft from the movement of said element in one direction of its movement, and a roller clutch means connected between said shaft and said frame and positioned to hold said shaft stationary against rotation during movement of said element in its other direction, whereby said device is rotated intermittently and unidirectionally at predetermined time intervals.

3. The subject-matter of claim 2, wherein there is a micrometrically adjustable abutment positioned to act as a stop to arrest the movement of said oscillatory member toward said cam, whereby to vary the extent of the angular movement of said element and, hence, the number of operations of said device within a given period of time.

4. In a time control mechanism of the character described, a supporting frame, a device to be actuated intermittently and unidirectionally, a shaft journalled in said frame, a cam fast on said shaft for actuating said device, a wheel-like member fast on said shaft and having roller-clutch lands spaced around its periphery and extending in the same direction, plate-members on both sides of said wheel-like member and having annular flanges surrounding the periphery of said member circumferentially on opposite side of said periphery respectively, two sets of rollers on said lands, one set being positioned to cooperate with the flange of one plate and the other set of rollers being positioned to cooperate with the flange of the other plate, one of said plates being fixed to said frame, a lever mounted for oscillatory movement about the axis of said shaft and fixed to the other of said plates, a continuously rotating spindle, a cam fast on said spindle, biasing means for moving the free end of said lever in contact with said cam on said spindle, said roller-clutch lands narrowing in the direction of movement of said lever imparted by its biasing means.

5. The subject-matter of claim 4 wherein a threadedly adjustable stop is provided at the distal end portion of said lever to limit and vary the extent of the angular movement of said lever.

6. A variable time switch mechanism comprising a switch, a rotatable cam associated with said switch for actuating said switch, a driving means for intermittently rotating said cam, said driving means including a continuously-rotating spindle, a roller-clutch mechanism for actuating said cam, a spring-biased lever-arm mounted to oscillate about the axis of said clutch mechanism and connected to the driving-part of said clutch and positioned to be oscillated by said spindle in one direction of its oscillatory movement and causing said cam to rotate intermittently and unidirectionally by the movement of said lever-arm in its other direction and, hence, cause the switch to carry out its make-and-break movements at predetermined time intervals.

7. The subject matter of claim 6 wherein there is a micrometrically adjustable means positioned to vary the degree of movement imparted to said lever-arm by said spindle, whereby the movement of operations of switch may be varied within a given period of time.

References Cited in the file of this patent

UNITED STATES PATENTS

| | | |
|---|---|---|
| 2,636,089 | Midgley | Apr. 21, 1953 |
| 2,656,424 | Frerer et al. | Oct. 20, 1953 |
| 2,703,347 | Constantine | Mar. 1, 1955 |
| 2,758,166 | Aust et al. | Aug. 7, 1956 |
| 2,814,683 | Wharton | Nov. 26, 1957 |